(12) United States Patent
Huang

(10) Patent No.: US 8,351,140 B2
(45) Date of Patent: Jan. 8, 2013

(54) LENS BARREL AND LENS MODULE

(75) Inventor: Chien-Feng Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 201 days.

(21) Appl. No.: 12/913,792

(22) Filed: Oct. 28, 2010

(65) Prior Publication Data

US 2011/0317289 A1 Dec. 29, 2011

(30) Foreign Application Priority Data

Jun. 28, 2010 (TW) ............................... 99120997 A

(51) Int. Cl.
*G02B 7/02* (2006.01)
*G02B 15/14* (2006.01)
(52) U.S. Cl. ........................................ 359/819; 359/704

(58) Field of Classification Search .......... 359/694–704, 359/811–830
See application file for complete search history.

(56) References Cited

U.S. PATENT DOCUMENTS

| 2007/0133106 A1* | 6/2007 | Park | 359/738 |
| 2011/0044679 A1* | 2/2011 | Yoshida et al. | 396/133 |

* cited by examiner

*Primary Examiner* — Mohammed Hasan
(74) *Attorney, Agent, or Firm* — Altis Law Group, Inc.

(57) ABSTRACT

An exemplary lens barrel includes a hollow main body. The hollow main body includes a first end at an object side, and an opposite second end at an image side. The hollow main body also including a cylindrical inner surface adjacent to the first end, a partially conical inner surface adjacent to the second end, and a ring-shaped groove located between the cylindrical inner surface and the partially conical inner surface. The partially conical inner surface faces toward the first end. A cone angle of the partially conical inner surface is in a range from 8 degrees to 16 degrees.

14 Claims, 3 Drawing Sheets

LENS BARREL AND LENS MODULE

BACKGROUND

1. Technical Field

The present disclosure relates to the field of photography, and particularly to a lens barrel and a lens module with the lens barrel.

2. Description of Related Art

Nowadays, lens modules are in widespread use in various kinds of electric devices, such as digital cameras, cell phones, laptop computers, etc.

A lens module typically includes a lens barrel and a number of optical members (e.g. lenses, filters, etc). During assembly of the lens module, an optical axis of a lens may all too easily be set out of alignment with the optical axis of the lens module, thereby reducing imaging quality of the lens module.

What is needed, therefore, is a new lens barrel, and a new lens module, which can overcome the above-described problem.

DETAILED DESCRIPTION

Embodiments will now be described in detail below with reference to the drawings.

Figure 1:
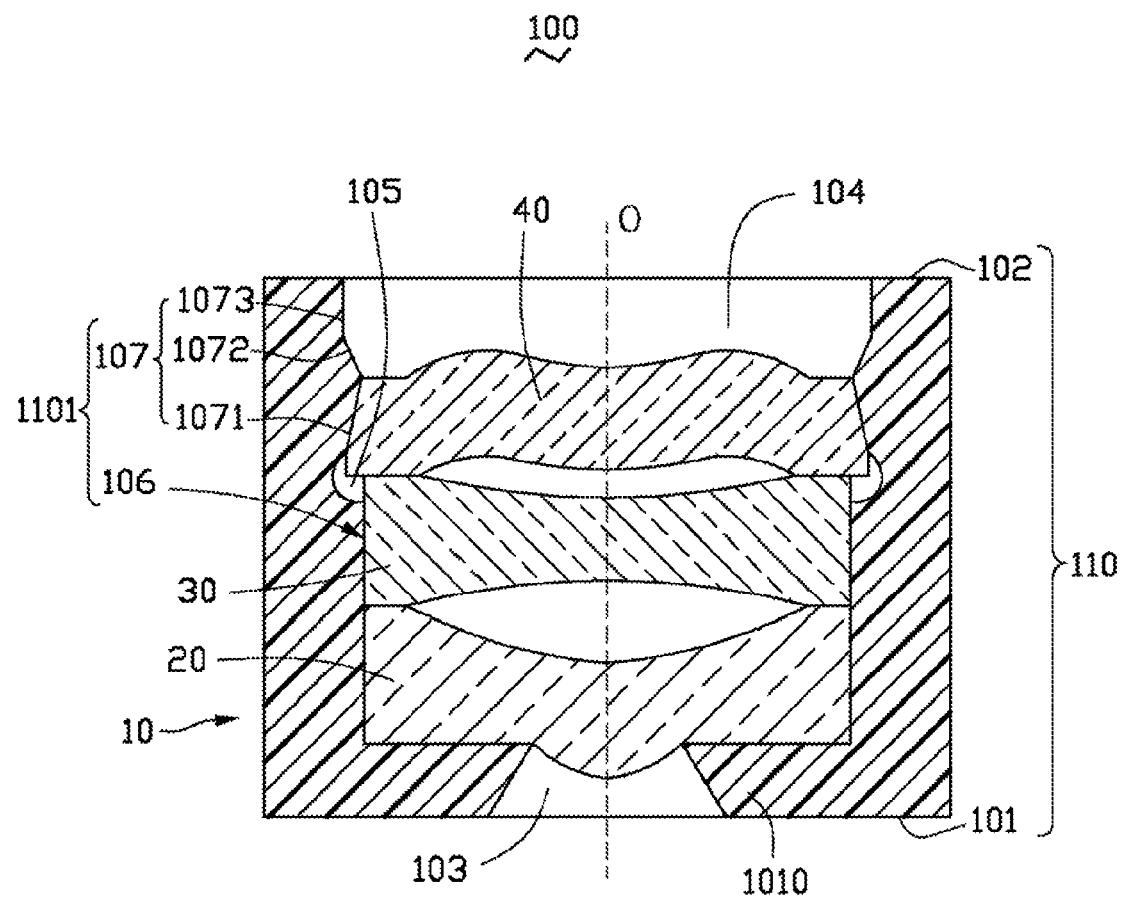
FIG. 1 is a schematic view of a lens module according to a first embodiment.
Figure 2:
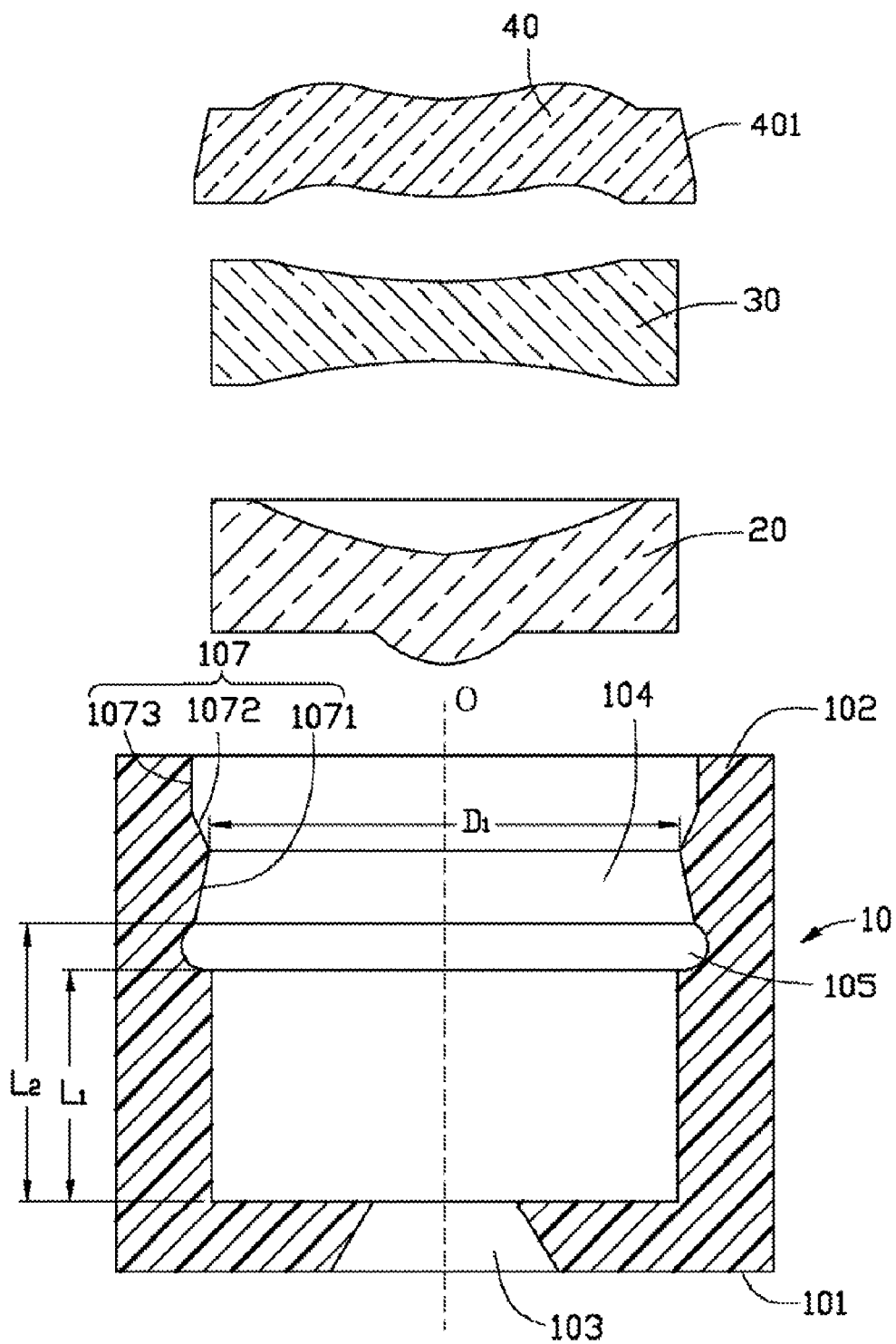
FIG. 2 is an exploded schematic view of the lens module of FIG. 1.

Referring to FIGS. 1 and 2, a lens module 100, in accordance with a first embodiment, is shown. The lens module 100 includes a lens barrel 10, a first optical member 20, a second optical member 30, and a third optical member 40. In the present embodiment, the first optical member 20, the second optical member 30, and the third optical member 40 are lenses with a central optical portion and a peripheral portion surrounding the central optical portion (not labeled).

In the present embodiment, the lens barrel 10 is a hollow cylindrical body, and includes a hollow main body 110. The hollow main body 110 includes a first end 101 at an object side, and an opposite second end 102 at an image side.

The first end 101 has a lip portion 1010 extending inwardly from the hollow main body 110 along the circumferential direction of the hollow main body 110. The lip portion 1010 is configured for preventing the first optical member 20, the second optical member 30, and the third optical member 40 from falling out of the lens barrel 10. A light passing through hole 103 is defined by the lip portion 1010 for allowing light to enter into the lens barrel 100, and reach the first optical member 20.

A cylindrical receiving cavity 104 is surrounded by the inner surface 1101 of the main body 110. The receiving cavity 104 communicates with the light passing through hole 103. In the present embodiment, the lens barrel 10 is made of plastic.

The inner surface 1101 defines a ring-shaped groove 105 adjacent to the second end 102. In other words, the second end 102 is closer to the groove 105 than the first end 101.

The inner surface 1101 includes a cylindrical inner surface 106 adjacent to the first end 101, and a ring-shaped latching portion 107 adjacent to the second end 102. The groove 105 is located between the cylindrical inner surface 106 and the ring-shaped latching portion 107.

The latching portion 107 includes a ring-shaped engaging surface 1071 having a truncated cone shape in cross-section (i.e. the engaging surface 1071 is a partially conical inner surface), and is exposed in the groove 105. The angle between the engaging surface 1071 and the central axis O of the lens barrel 10 is in a range from 4 degrees to 8 degrees (i.e. a cone angle of the partially conical inner surface is in a range from 8 degrees to 16 degrees).

The engaging surface 1071 faces toward the first end 101. In other words, the end of the engaging surface 1071 adjacent to the second end 102 is nearer to the central axis O than the end of the engaging surface 1071 adjacent to the first end 101, or the distance between the end of the engaging surface 1071 adjacent to the first end 101 and the central axis O is greater than the distance between the end of the engaging surface 1071 adjacent to the second end 102 and the central axis O. In the present embodiment, the angle between the engaging surface 1071 and the central axis O of the lens barrel 10 is about 6 degrees.

In the present embodiment, the latching portion 107 also includes a ring-shaped inclined surface 1072 inclined relative to the central axis O, and a cylindrical surface 1073.

The inclined surface 1072 is located between the engaging surface 1071 and the cylindrical surface 1073. The inclined surface 1072 also presents a truncated cone shape in cross-section, and faces toward the second end 102. In other word, the end of the inclined surface 1072 adjacent to the first end 101 is nearer to the central axis O than the end of the inclined surface 1072 adjacent to the second end 102, thereby allowing the third optical member 40 to easily enter into the receiving cavity 104. The diameter D of the joint between the inclined surface 1072 and the engaging surface 1071 is equal to or larger than the largest diameter of the optical member with the largest diameter of the first optical member 20 and the second optical member 30, thereby allowing the first optical member 20 and the second optical member 30 to easily enter into the receiving cavity 104.

The cylindrical surface 1073 is directly connected to the inclined surface 1072, and connects the end surface of the second end 102 to the inclined surface 1072. The cylindrical surface 1073 is parallel with the central axis O. The diameter of the cylindrical surface 1073 is equal to or larger than the largest diameter of the third optical member 40, thereby allowing the third optical member 40 to easily enter into the receiving cavity 104.

The first optical member 20, the second optical member 30, and the third optical member 40 are successively put into the receiving cavity 104 from the second end 102 in that order. The shape of the outside surface 401 of the third optical member 10 complements the shape of the engaging surface 1072, thereby making the outside surface 401 securely contact with the engaging surface 1072. The end portion of the third optical member 10 adjacent to the first end 101 is received in the groove 105.

In the present embodiment, the sum of the thicknesses of the peripheral portions of the first optical member 20 and the second optical member 30 is greater than the distance L1 between the edge of the groove 105 adjacent to the first end 101, and the inner surface of the lip portion 1010, and is smaller than the distance L2 between the joint, which is between the groove 105 and the engaging surface 1071, and the inner surface of the lip portion 1010, thereby making the surface of the periphery portion of the second optical member 30 adjacent to the second end 102 securely contact the surface of the periphery portion of the third optical member 40 adjacent to the first end 101 in the process of putting the third optical member 40 into the lens barrel 10. Accordingly, floating of the second optical member 30 towards the second end 102 can be prevented during assembly of the lens barrel 10.

In alternative embodiments, there may be a plurality of optical members between the first optical member 20 and the third optical member 40. In other alternative embodiments, the second optical member 30 may be a spacer, a filter, etc.

Because the engaging surface 1071 faces toward the first end 101, and the angle between the engaging surface 1071 and the central axis O of the lens barrel 10 is in a range from 4 degrees to 8 degrees, the engaging surface 1071 can press the third optical member 10 towards the first end 101. The possibility of misalignment of the optical axis of the third optical member 40 relative to the central axis O (i.e. the optical axis of the lens module 10) and floating of the third optical member 40 towards the second end 102 can be reduced or eliminated during assembly of the lens barrel 10.

In addition, because the outside surface 401 of the third optical member 40 securely contacts the engaging surface 1072, and the engaging surface 1071 can press the third optical member 40 towards the first end 101, glue between the third optical member 40 and the lens barrel 10 can be omitted. The time of the assembly of the lens barrel 10 can thus be shortened, and the efficiency of assembling the lens barrel 10 can thus be improved.

Figure 3:
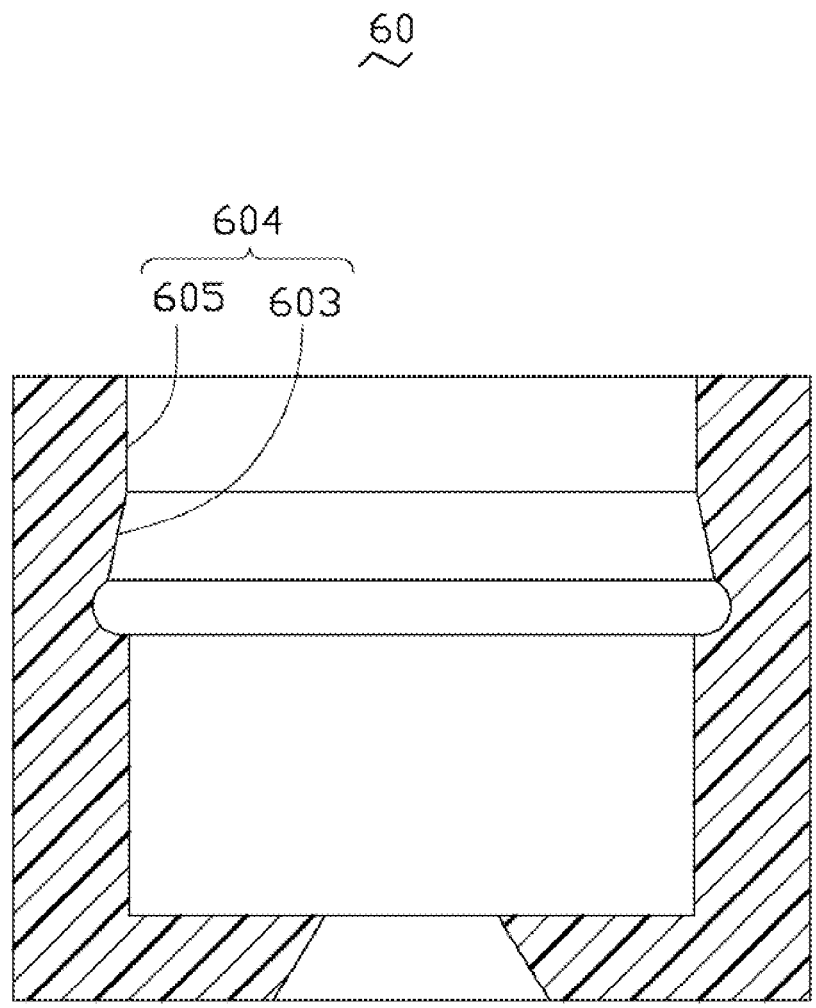
FIG. 3 is a schematic view of a lens module according to a second embodiment.

Referring to FIG. 3, a lens barrel 60, in accordance with a second embodiment, is shown. The lens barrel 60 is similar to the lens barrel 10, except that, the cylindrical surface 605 of the ring-shaped latching portion 604 of the lens barrel 10 is directly connected to the ring-shaped engaging surface 603, and the diameter of cylindrical surface 605 is slightly smaller than the largest diameter of the third optical member 40.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A lens barrel comprising:
a hollow main body, the hollow main body comprising a first end at an object side, and an opposite second end at an image side, the hollow main body including a cylindrical inner surface adjacent to the first end, a partially conical inner surface adjacent to the second end, and a ring-shaped groove located between the cylindrical inner surface and the partially conical inner surface, the partially conical inner surface facing toward the first end, a cone angle of the partially conical inner surface being in a range from 8 degrees to 16 degrees.

2. The lens barrel of claim 1, wherein the second end is closer to the groove than the first end.

3. The lens barrel of claim 1, wherein the hollow main body further comprises a ring-shaped inclined surface inclined relative to the central axis, the ring-shaped inclined surface facing toward the second end, and the partially conical inner surface interconnected between the cylindrical inner surface and the ring-shaped groove.

4. The lens barrel of claim 1, wherein the cone angle of the partially conical inner surface is about 6 degrees.

5. A lens barrel comprising:
a hollow main body comprising a first end at an object side, and an opposite second end at an image side, the inner surface of the hollow main body defining a ring-shaped groove adjacent to the second end, the inner surface having a ring-shaped latching portion adjacent to the second end, the ring-shaped latching portion comprising a ring-shaped engaging surface exposed in the ring-shaped groove, the angle between the ring-shaped engaging surface and the central axis of the lens barrel being in a range from 4 degrees to 8 degrees, the ring-shaped engaging surface facing to the first end.

6. The lens barrel of claim 5, wherein the ring-shaped latching portion comprises a ring-shaped inclined surface inclined relative to the central axis, the ring-shaped inclined surface facing to the second end, and the ring-shaped engaging surface interconnected between the cylindrical surface and the ring-shaped groove.

7. The lens barrel of claim 6, wherein the ring-shaped latching portion further comprises a cylindrical surface, the ring-shaped inclined surface interconnected between the cylindrical surface and the ring-shaped engaging surface.

8. The lens barrel of claim 5, wherein the angle between the ring-shaped engaging surface and the central axis of the lens barrel is about 6 degrees.

9. The lens barrel of claim 5, wherein the ring-shaped engaging surface has a truncated cone shape in cross-section.

10. A lens module comprising:
a lens barrel comprising a hollow main body, the hollow main body comprising a first end at an object side, and an opposite second end at an image side, the inner surface of the hollow main body defining a ring-shaped groove adjacent to the second end, the inner surface including a ring-shaped latching portion adjacent to the second end, the ring-shaped latching portion comprising a ring-shaped engaging surface exposed in the ring-shaped groove, the angle between the ring-shaped engaging surface and the central axis of the lens barrel being in a range from 4 degrees to 8 degrees, the ring-shaped engaging surface facing to the first end, and
at least two optical members received in the receiving cavity, the at least two optical members comprising a lens adjacent to the second end, a peripheral surface of the lens contacting the ring-shaped engaging surface.

11. The lens module of claim 10, wherein the ring-shaped latching portion comprises a ring-shaped inclined surface inclined relative to the central axis, the ring-shaped inclined surface facing to the second end, and the ring-shaped engaging surface interconnected between the cylindrical surface and the ring-shaped groove.

12. The lens module of claim 11, wherein the ring-shaped latching portion further comprises a cylindrical surface, the ring-shaped inclined surface interconnected between the cylindrical surface and the ring-shaped engaging surface.

13. The lens module of claim 10, wherein the angle between the ring-shaped engaging surface and the central axis of the lens barrel is about 6 degrees.

14. The lens module of claim 10, wherein the ring-shaped engaging surface has a truncated cone shape in cross-section.

* * * * *